June 8, 1948.  A. CONHAGEN  2,442,919
PLASTIC TUBE BEARING

Filed March 9, 1944  2 Sheets-Sheet 1

INVENTOR.
Alfred Conhagen
Zoltan A. Polacsek
BY
ATTORNEY

June 8, 1948.  A. CONHAGEN  2,442,919
PLASTIC TUBE BEARING
Filed March 9, 1944  2 Sheets-Sheet 2

INVENTOR.
Alfred Conhagen
BY
ATTORNEY

Patented June 8, 1948

2,442,919

UNITED STATES PATENT OFFICE 2,442,919

PLASTIC TUBE BEARING

Alfred Conhagen, New York, N. Y., assignor to Alfred Conhagen, Inc., New York, N. Y.

Application March 9, 1944, Serial No. 525,665

4 Claims. (Cl. 308—36.1)

This invention relates to new and useful improvements in plastic tube bearings.

More particularly the invention proposes an improved plastic tube bearing characterized by a cylindrical shell with keeper strips mounted within said shell on diametrically opposite sides and a plurality of half rings of plastic bearing material, preferably plastic phenol resin within said shell and between and held by said strips.

The main objection to the stave type of plastic bearings, now in general use is that it is never available when it is required. When a ship goes into drydock the owner and shipyard are anxious to get the ship off the dock as quickly as possible. Under present conditions, the sizes of the bearings cannot be obtained until the propeller and shaft are withdrawn. It is then necessary to take sizes and send this information back to the factory where the bearing is fabricated. In the meantime the vessel must wait on drydock until the bearing is delivered. The owners and shipyards refuse to wait until a tailor made bearing can be furnished, and obviously much bearing business is thus lost.

The dominating feature of the improved bearing covered by this application resides in the fact that it will lend itself to being fabricated right in the shipyards. It is proposed to furnish a series of rings which will give end grain wear the same as a stave type bearing and which will provide the necessary clearance for expansion.

It is proposed to furnish rings of such inside and outside diameter to permit various of shell and shaft sizes. The thickness of the rings will be more or less standard, approximately 3½" to 4". The material may be either molded to shape or machined from flat stock when the ship is placed on the drydock and the yard can get the size and immediately notify the storeroom what size discs or rings are required, which in turn can be machined in their shop and placed on board ship within a few hours of the time that the sizes are obtained.

Some of the advantages inherent in the improved bearing may be listed as follows:

1. There is no deterioration of material; it may be carried in stock indefinitely.

2. Material can be either molded or cut from stock.

3. Material may be easily assembled and fitted.

4. The initial cost is low.

5. Renewal costs are low.

6. The bottom half of the bearing can be bored so that the shaft is right on the center line and the necessary clearance can be machined into the top half before the bearing is assembled.

7. New rings can be machined to fit taper on the shaft, if shaft is worn. The upper half of the bearing and the forward end of the lower half are rarely worn out in most cases and therefore it would not be necessary to remove more than the last few sections of the lower half.

The invention contemplates recessing the sides of said rings for providing room for expansion. Positive contact between the ends of the ring halves and the keeper strips might be relieved if desired to permit peripheral expansion.

It is also proposed to provide longitudinally extending water grooves in the rings.

The invention contemplates the provision of means for sealing the bearing because one of the difficulties experienced on propeller shaft bearings is the rapid wear down in the aft end of the bottom section due to sandy and dirty water. The object of sealing the bearing is to keep the sandy water out.

A new and novel seal is proposed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure—

Figure 1:
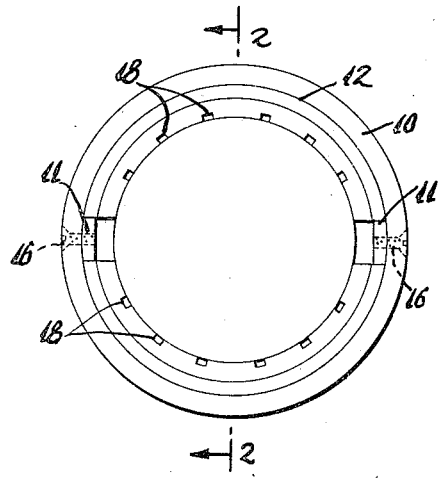
Fig. 1 is an end elevational view of a plastic bearing constructed in accordance with this invention.
Figure 2:
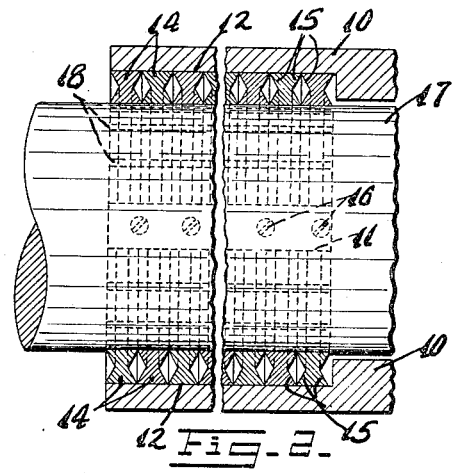
Fig. 2 is a fragmentary vertical sectional view taken on the line 2—2 of Fig. 1.
Figure 3:
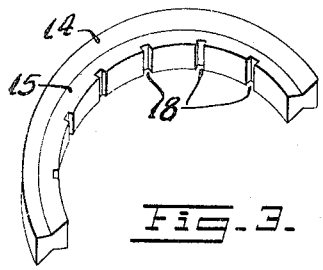
Fig. 3 is a perspective view of one of the half rings.

The plastic tube bearing, in accordance with this invention, includes a cylindrical shell 10. Keeper strips 11 are mounted within said shell 10 on diametrically opposite sides. The shell 10 is formed with a recessed portion 12 in which a plurality of half rings 14 of plastic bearing material, preferably phenol resin material, is disposed. These half rings 14 are engaged by said keeper strips 11.

The sides of the half rings 14 are formed with small recessed portions 15 for providing room for expansion. The keeper strips 11 are secured to the shell 10 by a plurality of fastening elements 16. The bearing is intended for a shaft 17 of a smaller diameter than the internal diameter of the shell 10. The shaft 17 is rotatively supported by said half rings 14. The half rings 14 are formed with longitudinally extending grooves 18 through which a lubricant may circulate.

An important feature of the invention resides in the fact that the half rings 14 may be kept in stock in approximate sizes and readily machined down to fit a shell and shaft on the job.

Figure 5:
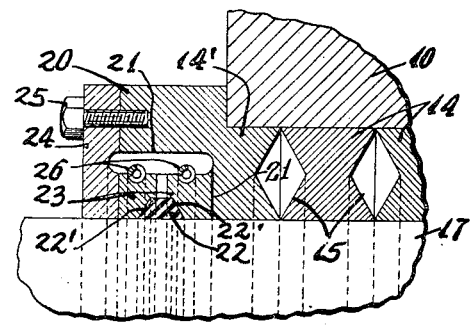
Fig. 5 is a fragmentary enlarged vertical sectional view taken on the line 5—5 of Fig. 4.
Figure 4:
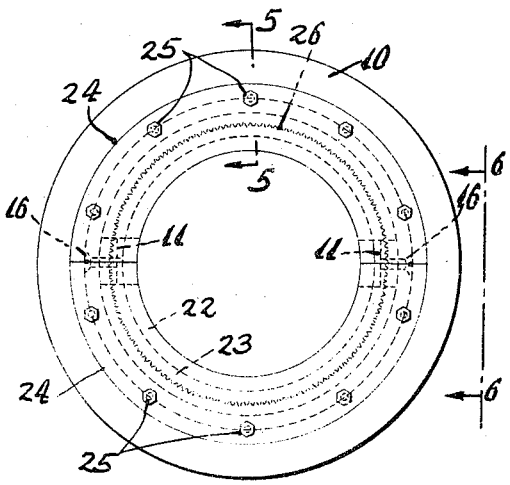
Fig. 4 is an end elevational view of a plastic tube bearing constructed in accordance with another form of this invention.
Figure 6:
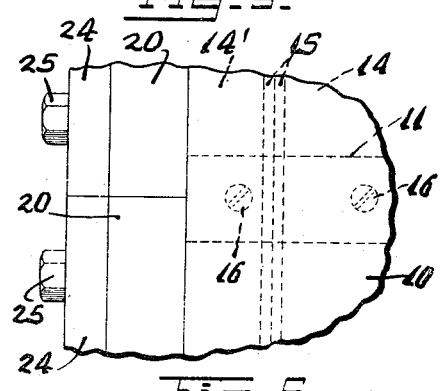
Fig. 6 is a fragmentary elevational view looking in the direction of the line 6—6 of Fig. 4.

In Figs. 4-6 inclusive a modified form of the invention has been disclosed which is very similar to the prior form, distinguishing merely in the fact that the outer half rings 14' are formed with enlarged portions 20 forming an annular housing. Said enlarged portions 20 are provided with annular grooves 21 for packing grease. A friction gasket 22 is provided for the shaft 17 of the bearing. This frictional gasket 22 is fixedly mounted on the shaft 17 and projects into said groove 21.

Split packing rings 23 are engaged on the gasket 22 for rotating with the shaft 17. A split cap 24 is mounted upon the enlarged portions 20 with cap screws 25, and serves to close the outer side of the annular groove 21. The packing rings 23 are associated with means for forcing them against said cap 24 and against the inner wall 21' of said annular groove 21. This means is in the nature of inclined sides 22' formed upon the friction gasket 22 and engaging complementary inclined portions upon the inner sides of the packing rings 23.

Garter springs 26 are engaged around the split packing rings 23 for urging them towards the friction gasket 22 so that said inclined sides thereof engage the inclined sides 22' of the gasket 22 which in turn forces the rings 23 laterally against the cap 24 and against the inner wall 21' of the groove, as stated. In other respects this form of the invention is similar to that previously shown and like reference numerals identify like parts in each of the several views.

Figure 7:
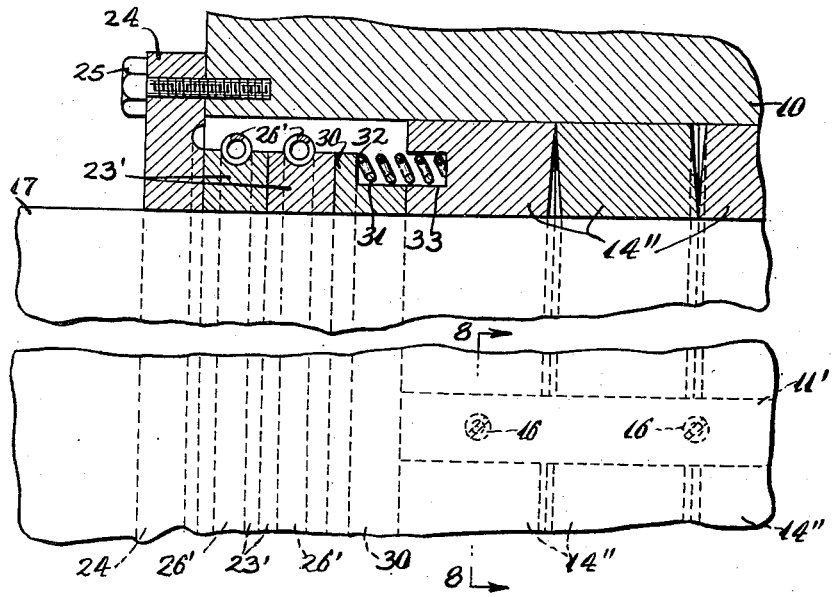
Fig. 7 is a view similar to Fig. 5 but illustrating a further modification of the invention.
Figure 8:
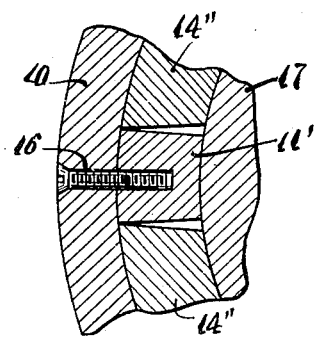
Fig. 8 is an enlarged partial vertical sectional view taken on the line 8—8 of Fig. 7.

In the modification of the invention shown in Figs. 7 and 8 the construction of the plastic tube bearing is similar to that disclosed in Figs. 4-6, except that the packing rings 23' and their respective garter springs 26' are located within the end of the cylindrical shell 10. More specifically, these packing rings 23' are located within the confines of the end of the cylindrical shell 10 and the lattermost half rings 14".

The half rings 14" have their adjacent surfaces beveled forming spaces there-between which allow for expansion in the width. Likewise, the ends of these half rings are also beveled at their point of contact with the keeper strips 11' to permit peripheral expansion of these half rings 14". The half rings 14" are constructed of plastic bearing material. The spaces formed by the beveled adjacent side portions of these half rings and the beveled end portions, in addition to permitting expansion also serve to circulate lubricant material about the shaft 17. In this form of the invention means is also provided between the adjacent faces of the half rings 14" and the packing rings 23' for urging the half rings 14" into engagement with each other. This means comprises a follower 30 mounted about the shaft 17' between the adjacent faces of the packing rings 23' and the half rings 14". Small expansion springs 31 operate between a shoulder 32 formed on the follower 30 and recesses 33 formed in the adjacent half ring 14". The expansion springs 31 are provided at spaced positions about the shaft 17' and tend to maintain the half rings 14" in facial engagement with each other.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A plastic tube bearing, comprising a cylindrical shell, keeper strips mounted within said shell on diametrically opposite sides, a plurality of half rings of plastic bearing material within said shell and between and held by said strips, and the sides of said half rings having slight wedged recesses for providing room for expansion.

2. A plastic tube bearing, comprising a cylindrical shell, keeper strips mounted within said shell in diametrically opposite sides, a plurality of half rings of plastic bearing material within said shell and between and held by said strips, and the sides of said half rings having slight wedged recesses where the recesses of adjoining rings form spaces of diamond shaped cross sections providing room for expansion, and means for sealing said bearing.

3. A plastic tube bearing, comprising a cylindrical shell, keeper strips mounted within said shell on diametrically opposite sides, a plurality of half rings of plastic bearing material within said shell and between and held by said strips, and the sides of said half rings having slight wedged recesses where the recesses of adjoining rings form spaces of diamond shaped cross sections providing room for expansion, and means for sealing said bearing, comprising enlarged portions integral with the outer ones of said half rings and forming an annular housing, said enlarged portions having an annular groove for packing grease, a friction gasket for the shaft of said bearing and disposed in said groove, split packing rings mounted on said gasket for rotating with said shaft, a split cap mounted on said enlarged portions for closing said annular groove and means for forcing said packing rings against said cap and the inner wall of said annular groove.

4. A plastic tube bearing, comprising a cylindrical shell, keeper strips mounted within said shell on diametrically opposite sides, a plurality of half rings of plastic bearing material within said shell and between and held by said strips, and the sides of said half rings having slight wedged recesses where the recesses of adjoining rings form spaces of diamond shaped cross sections providing room for expansion, and means for sealing said bearing, comprising enlarged portions integral with the outer ones of said half rings and forming an annular housing, said enlarged portions having an annular groove for packing grease, a friction gasket for the shaft of said bearing and disposed in said groove, split packing rings mounted on said gasket for rotating with said shaft, a split cap mounted on said enlarged portions for closing said annular groove and means for forcing said packing rings against said cap and the inner wall of said annular groove, comprising inclined sides upon said friction gasket engaging complementary inclined sides upon said packing rings, and garter springs upon said split packing rings urging them against said friction gaskets, whereby the inclined sides force the packing rings laterally as stated.

ALFRED CONHAGEN.

REFERENCES CITED

The following references are of record in the file of this patent:

UNITED STATES PATENTS

| Number | Name | Date |
|---|---|---|
| 111,479 | Schieder | Jan. 31, 1871 |
| 301,412 | Ulffers | July 1, 1884 |
| 1,437,185 | Lambert | Nov. 28, 1922 |
| 1,929,836 | Brown | Oct. 10, 1933 |
| 2,282,345 | Ruths | May 12, 1942 |
| 2,310,053 | Bastian | Feb. 2, 1943 |

FOREIGN PATENTS

| Number | Country | Date |
|---|---|---|
| 8,540 | Great Britain | 1906 |